(12) United States Patent
Ameko et al.

(10) Patent No.: US 12,395,511 B2
(45) Date of Patent: Aug. 19, 2025

(54) PROACTIVELY DETECTING AND REMEDIATING ANOMALOUS DEVICES USING SUPERVISED MACHINE LEARNING MODEL AND AUTOMATED COUNTERFACTUAL GENERATOR

(71) Applicant: Microsoft Technology Licensing, LLC, Redmond, WA (US)

(72) Inventors: Mawulolo Koku Ameko, Palmyra, VA (US); Kabir Walia, Cambridge, MA (US); Jyh-Han Lin, Mercer Island, WA (US); Vivek Gupta, Groton, MA (US); Ehimwenma Nosakhare, Newton, MA (US); Sean Gormley T. Kelley, Dublin (IE); Ashish Neupane, Seattle, WA (US); Jenna Hong, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 18/341,071

(22) Filed: Jun. 26, 2023

(65) Prior Publication Data
US 2024/0430280 A1    Dec. 26, 2024

(51) Int. Cl.
*H04L 41/16*    (2022.01)
*H04L 9/40*    (2022.01)

(52) U.S. Cl.
CPC .......... *H04L 63/1425* (2013.01); *H04L 41/16* (2013.01)

(58) Field of Classification Search
CPC ............................ H04L 63/1425; H04L 41/16
See application file for complete search history.

(56) References Cited

U.S. PATENT DOCUMENTS 11,509,674 B1    11/2022    Beauchesne et al.
2018/0314965 A1    11/2018    Dodson et al.
(Continued)

FOREIGN PATENT DOCUMENTS

WO    2022093239 A1    5/2022

OTHER PUBLICATIONS

Mothilal, et al., "Explaining Machine Learning Classifiers through Diverse Counterfactual Explanations", In Repository of arXiv:1905.07697v1, May 19, 2019, 11 Pages.

*Primary Examiner* — Ryan J Jakovac
(74) *Attorney, Agent, or Firm* — Ray Quinney & Nebeker P.C.; James S. Bullough

(57) ABSTRACT

A computer-implemented method for proactively detecting and remediating anomalous devices includes accessing, via a network, device attributes corresponding to enterprise devices within an enterprise network, providing the device attributes to a supervised machine learning model, and predicting, via the supervised machine learning model, whether each enterprise device is healthy or anomalous, where the enterprise device is predicted to be healthy unless the supervised machine learning model determines that the probability of the enterprise device being anomalous exceeds a specified confidence threshold. The method includes, for each enterprise device that is predicted to be anomalous, perturbing a portion of the corresponding device attributes via an automated counterfactual generator to generate synthetic data representative of counterfactual healthy devices. The method includes generating recommended remedial action(s) that will cause each enterprise device to approximate each counterfactual healthy device and causing surfacing, via a user interface, of the recommended remedial action(s).

20 Claims, 8 Drawing Sheets

(56) References Cited

U.S. PATENT DOCUMENTS

| | | |
|---|---|---|
| 2022/0188645 A1 | 6/2022 | Nia et al. |
| 2022/0207353 A1 | 6/2022 | Barr et al. |
| 2022/0230083 A1 | 7/2022 | Vishwakarma et al. |

PROACTIVELY DETECTING AND REMEDIATING ANOMALOUS DEVICES USING SUPERVISED MACHINE LEARNING MODEL AND AUTOMATED COUNTERFACTUAL GENERATOR

BACKGROUND

The present disclosure generally relates to device analytics. More specifically, the present disclosure relates to proactively detecting and remediating anomalous devices using a supervised machine learning model and an automated counterfactual generator.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for proactively detecting and remediating anomalous devices within an enterprise network is described. The method is implemented via a device including a processor. The method includes accessing, via a network, device attributes corresponding to enterprise devices within an enterprise network, providing the device attributes to a supervised machine learning model, and predicting, via the supervised machine learning model, whether each enterprise device is healthy or anomalous, where the enterprise device is predicted to be healthy unless the supervised machine learning model determines that a probability of the enterprise device being anomalous exceeds a specified confidence threshold. The method also includes, for each enterprise device that is predicted to be anomalous, perturbing a portion of the corresponding device attributes via an automated counterfactual generator to generate synthetic data representative of counterfactual healthy devices corresponding to the enterprise device, where each counterfactual healthy device is predicted to be healthy via the supervised machine learning model based on the perturbation of the corresponding device attributes. The method further includes generating, for each enterprise device that is predicted to be anomalous, one or more recommended remedial actions that will cause the enterprise device to approximate each corresponding counterfactual healthy device as represented by the synthetic data, as well as causing surfacing, via a user interface, of the recommended remedial action(s) for each enterprise device that is predicted to be anomalous.

In another embodiment described herein, a service provider device is provided. The service provider device includes a processor and a communication connection for connecting enterprise devices and an enterprise admin device to the service provider device via a network, where the enterprise devices and the enterprise admin device are within a same enterprise network. The service provider device also includes a computer-readable storage medium operatively coupled to the processor. The computer-readable storage medium includes computer-executable instructions that, when executed by the processor, cause the processor to access, via a network, device attributes corresponding to the enterprise devices, to provide the device attributes to a supervised machine learning model, and to predict, via the supervised machine learning model, whether each enterprise device is healthy or anomalous, where the enterprise device is predicted to be healthy unless the supervised machine learning model determines that a probability of the enterprise device being anomalous exceeds a specified confidence threshold. The computer-executable instructions, when executed by the processor, also cause the processor to, for each enterprise device that is predicted to be anomalous, perturb a portion of the corresponding device attributes via an automated counterfactual generator to generate synthetic data representative of counterfactual healthy devices corresponding to the enterprise device, where each counterfactual healthy device is predicted to be healthy via the supervised machine learning model in accordance with the specified confidence threshold. The computer-executable instructions, when executed by the processor, further cause the processor to generate, for each enterprise device that is predicted to be anomalous, one or more recommended remedial actions that will cause the enterprise device to approximate each corresponding counterfactual healthy device as represented by the synthetic data, as well as to cause surfacing, via a user interface provided on a display of the enterprise admin device, of the recommended remedial action(s) for each enterprise device that is predicted to be anomalous.

In another embodiment described herein, a computer-readable storage medium is provided. The computer-readable storage medium includes computer-executable instructions that, when executed by a processor, cause the processor to access, via a network, device attributes corresponding to enterprise devices within an enterprise network, to provide the device attributes to a supervised machine learning model, and to predict, via the supervised machine learning model, whether each enterprise device is healthy or anomalous, where the enterprise device is predicted to be healthy unless the supervised machine learning model determines that a probability of the enterprise device being anomalous exceeds a specified confidence threshold. The computer-readable storage medium also includes computer-executable instructions that, when executed by the processor, cause the processor to, for each enterprise device that is predicted to be anomalous, perturb a portion of the corresponding device attributes via an automated counterfactual generator to generate synthetic data representative of counterfactual healthy devices corresponding to the enterprise device, where each counterfactual healthy device is predicted to be healthy via the supervised machine learning model based on the perturbation of the corresponding device attributes. The computer-readable storage medium further includes computer-executable instructions that, when executed by the processor, cause the processor to generate, for each enterprise device that is predicted to be anomalous, one or more recommended remedial actions that will cause the enterprise device to approximate each corresponding counterfactual healthy device as represented by the synthetic data, as well as to cause surfacing, via a user interface, of the recommended remedial action(s) for each enterprise device that is predicted to be anomalous.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
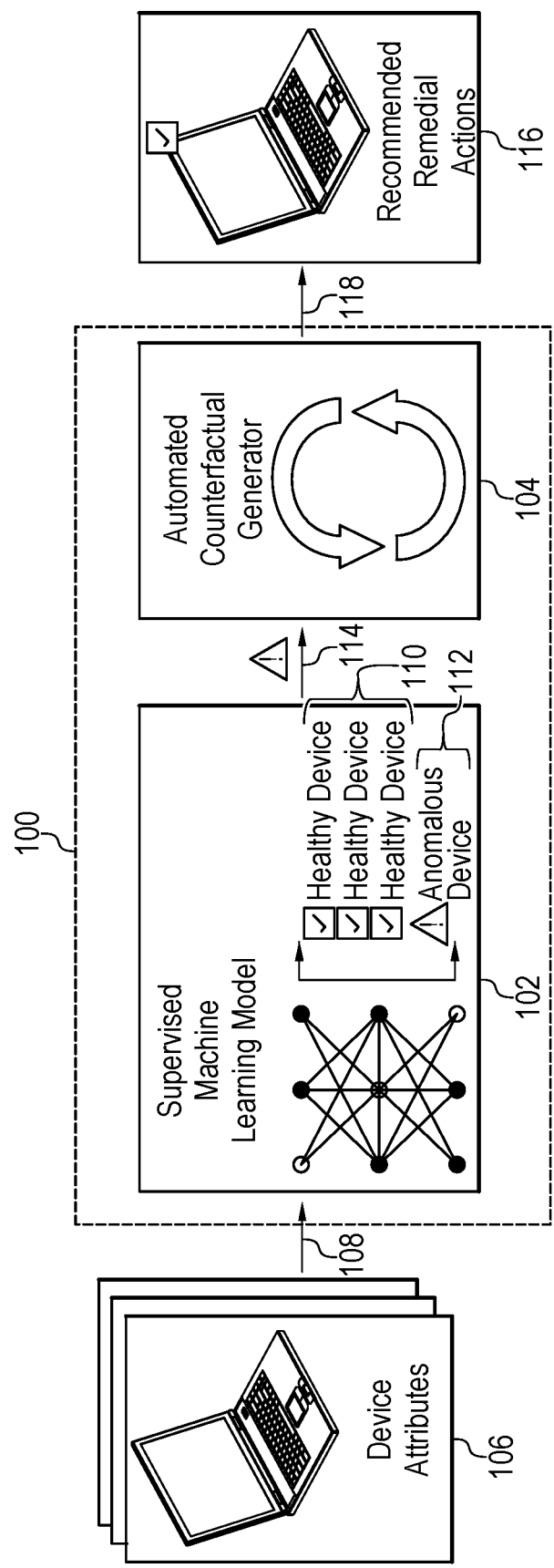
FIG. 1 is a simplified schematic view depicting the exemplary operation of an anomalous device detection and remediation system according to embodiments described herein.

Enterprises generally conduct routine analysis of device behavior within the enterprise network to ensure all enterprise devices are running properly. In particular, enterprise administrators (e.g., IT admins) often utilize cloud-based device management services (e.g., Microsoft® Endpoint Manager provided by Microsoft Corporation) to monitor the health of enterprise devices (e.g., continuing with the previous example, all devices within the enterprise network that utilize Windows® operating system). According to current solutions, enterprise admins typically receive daily or weekly reports from the cloud-based device management service, with such reports including health statistics for the corresponding enterprise devices. However, according to such solutions, anomalous device behavior is only detected after the end user's experience has already been compromised and a ticket has been sent to the enterprise admin, with the enterprise admin responding by leveraging their experience to triangulate the cause of the problem based on the performance of several lengthy steps that prolong the remediation process and, in turn, aggravate the end user. Accordingly, there is a need for an intelligent solution for early, proactive detection of anomalous devices as well as automatic generation of actionable remediation steps, which would proactively ensure device reliability, streamline the work of enterprise admins, and meet the needs of the end user.

The present techniques solve these and other issues by providing for the proactive detection and remediation of anomalous devices using a supervised machine learning model in combination with an automated counterfactual generator. More specifically, according to embodiments described herein, device attributes (e.g., including both categorical device attributes and numerical device attributes obtained, at least in part, from near-real-time device telemetry) are used to proactively predict device anomalies and to generate recommended remedial actions that the enterprise admin can implement, often before the end user experiences any issues with the device. This functionality is enabled through a combination of supervised machine learning and counterfactual analysis techniques that are applied by a service provider associated with the enterprise devices, such as, for example, the provider of the operating system running on such devices. Specifically, device attributes are input to a supervised machine learning model, which is trained to predict whether the device is anomalous or healthy. When the supervised machine learning model predicts (with some specified confidence threshold) that the device is anomalous, an automated counterfactual generator then perturbs a portion of the device attributes and generates synthetic data representative of corresponding counterfactuals that would cause the supervised machine learning model to predict that the device is healthy rather than anomalous. The outcome of this process is provided to the enterprise admin (or, alternatively, the end user) as one or more recommended remedial actions, which may be surfaced via a user interface associated with a cloud-based device management service provided by the service provider, for example. The report may also include an overall device health score, which may enable the enterprise admin to proactively determine that a device is anomalous, often before the end user's experience is compromised. Moreover, the recommended remedial actions generated according to the present techniques may be customized to the particular enterprise by, for example, accounting for enterprise-level policies, as described further herein.

As used herein, the term "anomalous," when used with reference to a particular device, means that at least one signal (e.g., hardware-related signal and/or software-related signal) from the device indicates that the device is not behaving as expected. In contrast, the term "healthy," when used with reference to a particular device, means that the signals (e.g., hardware-related signals and/or software-related signals) from the device indicate that the device is behaving as expected. Moreover, in some embodiments, the meaning of the terminology "as expected" in this context is determined based on standards maintained by the respective device management service. However, a device that is behaving "as expected" generally functions in a normal or predictable manner.

The present techniques provide various advantages over conventional device management techniques. As an example, the present techniques apply counterfactual analysis techniques to the task of device management, which has not been previously applied within the context of large-scale enterprise products and services, such as cloud-based device management products and services. This enables enterprise admins to proactively receive, not only early warnings about poor device health, but also the concrete next best remedial actions, all without going through the typical prolonged process of manual remediation. As another example, while prior techniques focus on time series inputs with categorical attributes, the present techniques provide a more versatile, adaptable, and comprehensive approach by accommodating both temporal and cross-sectional data, without the requirement of any categorical attributes. As another example, prior counterfactual analysis techniques focus on the removal of one or more categorical attributes from anomalous devices to determine if the anomaly persists. In contrast, the present techniques go beyond simply removing categorical attributes and further consider modifying the values of both categorical and numerical attributes, with device health predictions being continuously rerun via the supervised machine learning model. This comprehensive approach enables the exploration of a wider range of potential solutions and provides more robust and effective remediation strategies. As another example, while prior techniques utilize unsupervised algorithms to detect spikes or drastic changes in time series values, the present techniques utilize a supervised approach that not only detects device anomalies but also predicts the probability of such device anomalies with a certain confidence level. As a result, the present techniques can be used to identify potential anomalies or errors that have not yet surfaced or have not significantly impacted the end user. Therefore, while prior techniques are reactive, the present techniques are proactive, enabling the performance of preemptive remedial actions to mitigate device issues before such issues become critical. Furthermore, as yet another example, the present techniques provide a remediation process that can be customized to the particular enterprise. For example, by disabling or limiting the perturbation of device attributes that are unalterable (or only alterable to a certain degree) due to specific enterprise-level policies, the remediation process provided by the present techniques may exclusively produce counterfactuals that correspond to actionable remediation steps for the enterprise.

Turning now to a detailed description of the drawings, FIG. 1 is a simplified schematic view depicting the exemplary operation of an anomalous device detection and remediation system 100 according to embodiments described herein. As shown in FIG. 1, the anomalous device detection and remediation system 100 includes a supervised machine learning model 102 that is trained to proactively predict (with a specified confidence threshold) whether enterprise devices are healthy or anomalous, as well as an automated counterfactual generator 104 that is configured to generate counterfactual healthy devices based on the perturbation of device attributes corresponding to the enterprise device that is predicted to be anomalous. Specifically, the supervised machine learning model 102 receives device attributes 106 corresponding to multiple enterprise devices within an enterprise network as input, as indicated by arrow 108. The supervised machine learning model then classifies each enterprise device as healthy or anomalous, where a device is only considered to be anomalous if the probability of the device behaving anomalously exceeds the specified confidence threshold. As shown in FIG. 1, the resulting output of the supervised machine learning model 102 is a list of one or more healthy devices 110 and one or more anomalous devices 112. The data corresponding to the anomalous device(s) 112 (e.g., including the corresponding device attributes 106) are then input to the automated counterfactual generator 104, as indicated by arrow 114. For each anomalous device 112, the automated counterfactual generator 104 then perturbs one or more corresponding device attributes (optionally in accordance with one or more specific enterprise-level policies), resulting in the generation of synthetic data representative of multiple counterfactual devices. Such counterfactual devices are hypothetical devices that approximate the behavior of the real, anomalous device if the corresponding device attribute(s) were to be altered. The supervised machine learning model is then applied to such counterfactual devices, resulting in the output of one or more counterfactual healthy devices. Such counterfactual healthy devices are then utilized to generate recommended remedial actions 116 that would cause the enterprise device that was predicted to be anomalous to instead be predicted to be healthy, where each recommended remedial action 116 includes a recommendation to alter the one or more device attributes that contributed to the counterfactual device being predicted to be healthy. Moreover, as indicated by arrow 118, such recommended remedial actions 116 may be provided to the enterprise admin and/or the end user by, for example, causing the recommended remedial actions 116 to be surfaced on a user interface provided on a display of a corresponding device. For example, in some embodiments, the user interface may be provided as part of a cloud-based device management service provided by the same service provider that provides the anomalous device detection and remediation system 100.

As specific examples of counterfactual devices that may be generated by the automated counterfactual generator 104, consider hypothetical devices that are generated by perturbing the following device attributes: (1) the operating system version; (2) the amount of disk capacity; and (3) the age of the device. The counterfactual devices generated according to such perturbations would include: (1) a hypothetical device with a newer operating system version than the anomalous device; (2) a hypothetical device with a higher disk capacity than the anomalous device; and (3) a hypothetical device that is newer than the anomalous device. Moreover, assuming that the supervised machine learning model classifies each of these counterfactual devise as healthy, the corresponding recommended remedial actions would include: (1) upgrade the operating system; (2) increase the disk capacity; and (3) purchase a new device.

The supervised machine learning model described herein may include any suitable type of classification model that is trained to predict whether a device is healthy or anomalous based on corresponding device attributes. Examples of suitable types of models include, but are not limited to, models based on decision tree algorithms and/or random forest algorithms. As a more specific example, the model may be based on a distributed gradient-boosting framework. Furthermore, the automated counterfactual generator described herein may include any suitable type of counterfactual generation engine that is configured to generate sets of diverse counterfactual examples that provide actionable, alternative positive outcomes based on the perturbation of features that led to initial negative outcomes.

According to embodiments described herein, the anomalous device detection and remediation process includes at least two phases: (1) an anomalous device detection phase; and (2) a device remediation phase. During the anomalous device detection phase, the service provider provides device attribute data corresponding to enterprise devices within a particular enterprise network to the supervised machine learning model at a regular cadence. This regular cadence may be every day, every two days, every week, or any other suitable cadence, which may be determined by the service provider or in response to input received from the enterprise admin (or, in some cases, the end user(s)). Moreover, the device attribute data for each enterprise device may include categorical and/or numerical attribute data corresponding to various hardware- and/or software-related signals for the enterprise device, where at least a portion of such attributes may be determined using near-real-time device telemetry for the enterprise device.

As described herein, the supervised machine learning model then predicts (with the specified confidence threshold) whether each enterprise device is healthy or anomalous. In particular, the supervised machine learning model is trained to classify each enterprise device as healthy or anomalous, where an enterprise device is classified as healthy unless the probability of the enterprise device behaving anomalously exceeds the specified confidence threshold. Such confidence threshold may be 50%, 75%, or any other suitable percentage, which may be determined by the service provider or in response to input received from the enterprise admin (or, in some cases, the end user(s)). In some embodiments, once the supervised machine learning model predicts that one or more enterprise devices are anomalous, the enterprise admin and/or the end user(s) are automatically alerted, thus allowing the enterprise admin and/or the end user(s) with the option of providing input regarding the second phase of the process.

Figure 2:
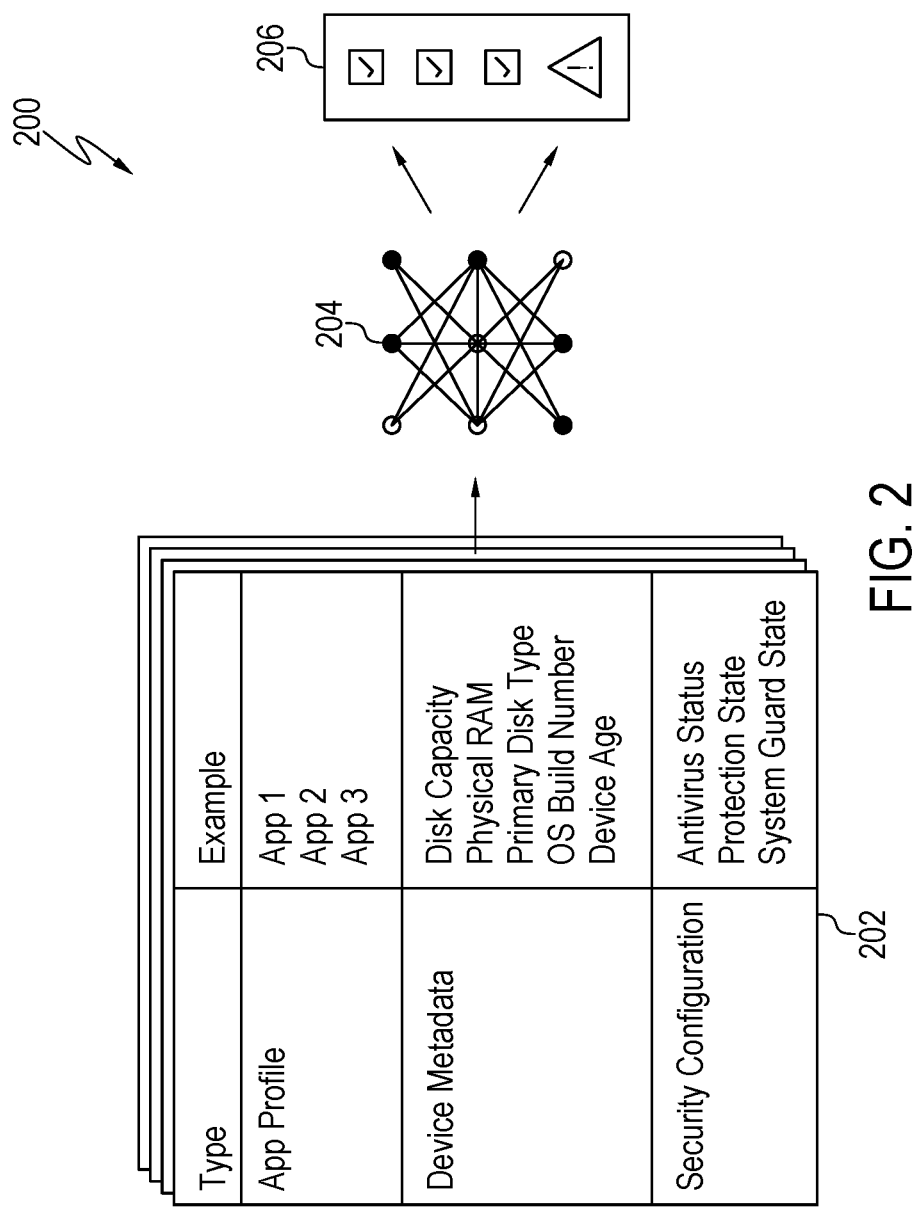
FIG. 2 is a simplified schematic view of an exemplary implementation of a process for detecting anomalous devices according to embodiments described herein.

The anomalous device detection phase of the process is illustrated by FIG. 2, which is a simplified schematic view of an exemplary implementation of a process 200 for detecting anomalous devices according to embodiments described herein. Specifically, according to the exemplary implementation shown in FIG. 2, device attributes 202 corresponding to the application profile, device metadata, and security configuration for numerous enterprise devices are input to a supervised machine learning model 204. The supervised machine learning model 204 then utilizes such device attributes 202 to output a list 206 of healthy devices and anomalous devices. This list is then provided to the device remediation phase of the process.

During the device remediation phase, for each enterprise device that was predicted to be (i.e., classified as) anomalous, one or more device attributes are selected for perturbation. For each enterprise device, the automated counterfactual generator described herein then generates synthetic data representative of multiple counterfactuals based on the perturbation of such device attributes. Specifically, each counterfactual is constructed based on synthetic data corresponding to a counterfactual device that approximates the real enterprise device, except with the altered device attributes. During this phase, each generated counterfactual device is evaluated using the supervised machine learning model, and only counterfactual devices that are predicted to be (i.e., classified as) healthy (with the specified confidence threshold) are utilized for the remainder of the process. According to embodiments described herein, such devices may be referred to as "counterfactual healthy devices," and each counterfactual healthy device approximates the behavior of the real enterprise device if the specific device attributes were as provided to the automated counterfactual generator (i.e., including the altered device attributes for the specific counterfactual).

Figure 3:
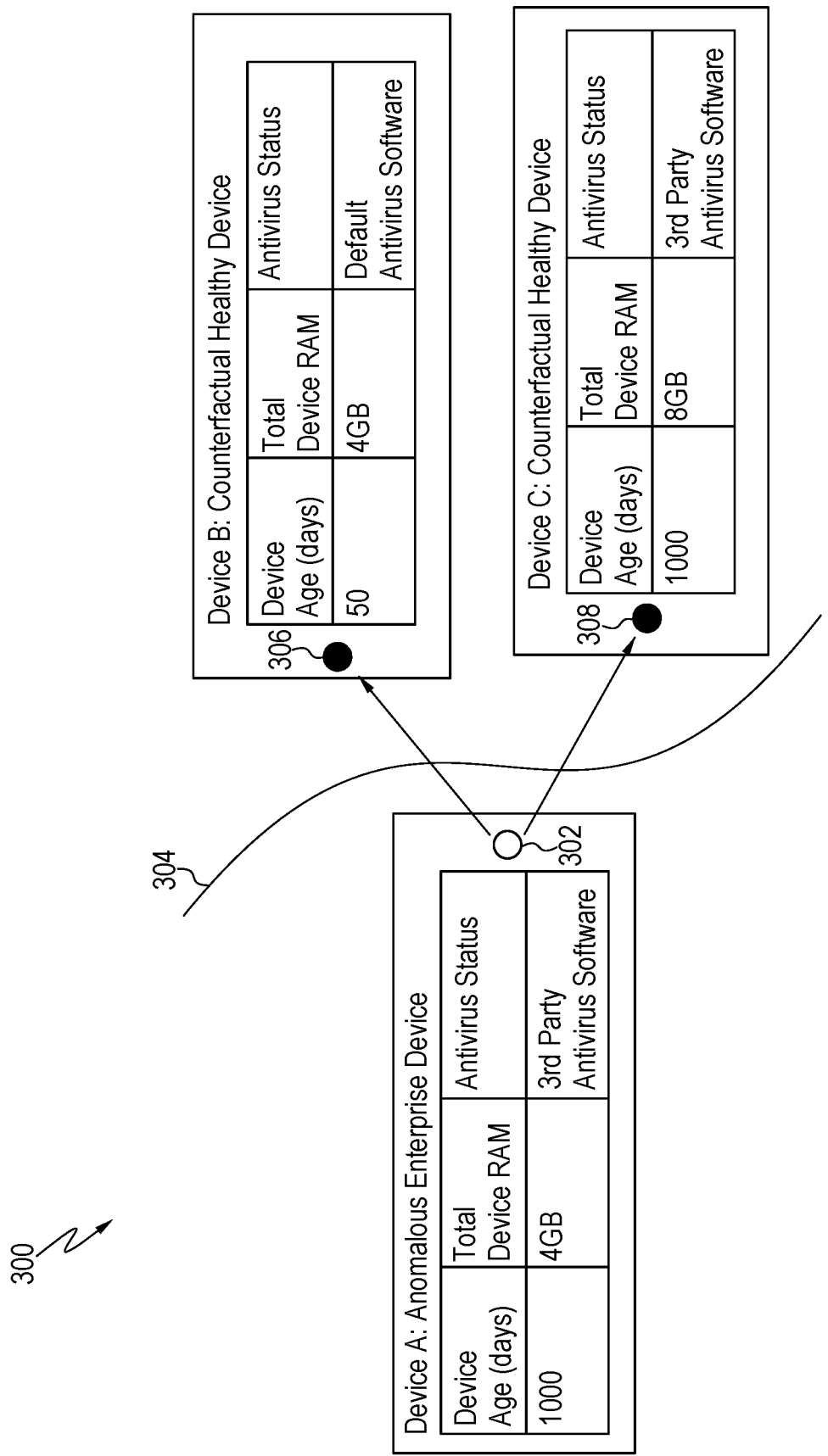
FIG. 3 is a simplified schematic view of an exemplary implementation of a process for remediating anomalous devices according to embodiments described herein.

This is illustrated by FIG. 3, which is a simplified schematic view of an exemplary implementation of a process 300 for remediating anomalous devices according to embodiments described herein. Specifically, the left side of FIG. 3 depicts Device A 302, which is an anomalous enterprise device (i.e., an enterprise device that has been predicted to be anomalous by the supervised machine learning model). For this simplified exemplary implementation, only three device attributes are considered, i.e., the device age (in days), the total device RAM, and the antivirus status. As shown in FIG. 3, Device A has a device age of 1000 days, total device RAM of 4 GB, and an antivirus status that indicates only third-party antivirus software is installed and activated.

Notably, in some embodiments, the device attributes to be perturbed are automatically determined by the automated counterfactual generator based on information corresponding to the enterprise device and/or the enterprise itself, such as any relevant enterprise-level policies. Additionally or alternatively, the device attributes to be perturbed are specified by the enterprise admin (or any of the corresponding end users). This may be facilitated by the user interface corresponding to the anomalous device detection and remediation system, which may include a settings functionality, for example.

According to the simplified exemplary implementation, two counterfactuals are generated, where each counterfactual corresponds to a healthy counterfactual device, as depicted on the right side of a model decision boundary 304 in FIG. 3. More specifically, Device B 306 is a healthy counterfactual device that has been generated by the automated counterfactual generator in response to perturbing the age of the device and the antivirus status. In particular, the age of the device was changed to 50 days, and the antivirus status was changed to indicate that only the default antivirus software is installed and activated. Because the supervised machine learning model has classified Device B 306 as healthy (as indicated by the model decision boundary 304), one or more recommended remedial actions are generated. In this case, the recommended remedial actions are to replace Device A 302 with a new device and to install and activate the default antivirus software. On the other hand, Device C 308 is a healthy counterfactual device that has been generated by the automated counterfactual generator in response to perturbing the total device RAM. In particular, the total device RAM was changed to 8 GB. Because the supervised machine learning model has classified Device C 308 as healthy (as indicated by the model decision boundary 304), one or more recommended remedial actions are generated. In this case, the recommended remedial action is to upgrade the RAM to 8 GB on the current device.

In various embodiments, the service provider device causes the recommended remedial actions to be surfaced on the enterprise admin device (and/or the end user device(s)) via a user interface that is provided as part of the anomalous device detection and remediation system. For example, in some cases, the anomalous device detection and remediation system is provided as a tool or application within a larger cloud-based device management service, and the user interface is surfaced in response to the user opening or selecting the tool/application. Moreover, in various embodiments, the enterprise admin (or end user(s)) may respond to the surfacing of the recommended remedial actions in various ways. As an example, in the case of an enterprise admin overseeing the enterprise devices within an enterprise network, the enterprise admin may respond by remotely implementing at least a portion of the recommended remedial actions for each enterprise device (or a portion thereof). As a more specific example, if the recommended remedial action for a particular enterprise device is to deactivate a certain stale security policy, the enterprise admin may remotely perform that action on the enterprise device. In some cases, the enterprise admin may also experiment with various different remedial actions that involve altering hardware- and/or software-related signals. This gives the enterprise admin the opportunity to stack-rank and easily attempt different troubleshooting approaches, while seamlessly remaining in alignment with enterprise-specific policies (i.e., because the generated remedial actions already account for such policies). In some embodiments, the system may also enable the enterprise admin to assign weights to particular remedial actions, where such weights indicate the ease or difficulty of altering the corresponding hardware- and/or software-related signal(s). This enables the system to prioritize remedial actions that are easier for the particular enterprise to implement. As a specific example, upgrading an existing device's RAM might be cheaper than replacing a device entirely; as a result, the system may prioritize remedial actions that involve updating RAM over remedial actions that involve replacing devices.

Moreover, in some embodiments, at least a portion of the recommended remedial actions for the enterprise devices are automatically implemented by the anomalous device detection and remediation system. As an example, the system may automatically activate/deactivate particular policies, antivirus software, or the like. In such embodiments, the enterprise admin may specify (via the settings) which remedial actions can be automatically implemented by the system. This further reduces the time and effort required for the enterprise admin to manage the devices.

As described herein, the perturbation of the device attributes may be limited by enterprise-specific policies. Such enterprise-specific policies may include (but are not limited to) enterprise-specific IT rules, such as, for example, a requirement that enterprises devices do not include RAM exceeding 64 GB. In addition, the system itself may include constraints on the perturbation of the device attributes. Such constraints may be based on real-life technical limitations, for example. A specific example of a real-life technical limitation is that RAM cannot be set to a decimal value (e.g., the RAM cannot be set to 4.3 GB). Such constraints may also be automatically inferred, at least in part, from historic enterprise device data.

Turning to a more detailed description of exemplary types of categorical and numerical device attributes that may be provided to the supervised machine learning model, such device attributes may include (but are not limited to) device attributes based on census data, device attributes based on application reliability data, and/or device attributes based on the latest machine profile data. With regard to the census data, each device may have several logs on the census stream, and only the rows with the latest data are considered. Specific examples of types of census data that may be utilized include (but are not limited to) the firmware manufacturer, the total physical RAM, the processor manufacturer, the processor cores, the primary disk total capacity, the primary disk type, the operating system build number, the driver inventory, whether a cloud domain is joined, and/or whether the device is a virtual device. With regard to the application reliability data, such data may include (but are not limited to) the crash count, the hang count, and/or the engagement duration for particular applications. Moreover, with regard to the latest machine profile data, such data may be regenerated daily. Examples of machine profile data that may be utilized include (but are not limited to) the antivirus software type(s) and antivirus software state(s) (e.g., activated, deactivated, out-of-date, etc.).

Figure 4:
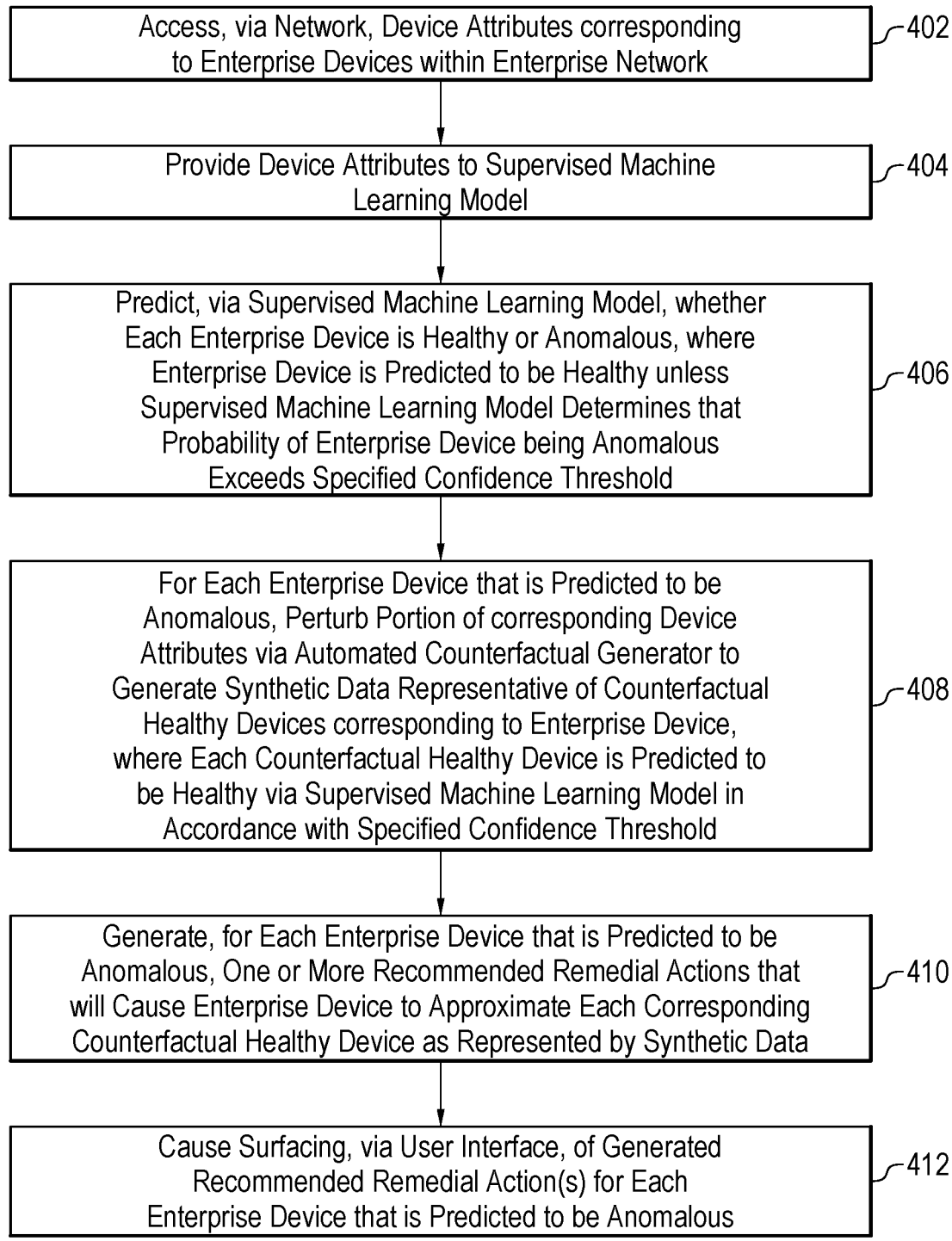
FIG. 4 is a process flow diagram of an exemplary method for proactively detecting and remediating anomalous devices within an enterprise network according to embodiments described herein.

FIG. 4 is a process flow diagram of an exemplary method for proactively detecting and remediating anomalous devices within an enterprise network according to embodiments described herein. The method 400 is executed via one or more devices, such as the exemplary device described with respect to FIG. 5. In particular, in various embodiments, the device(s) implementing the method 400 include one or more devices that are operated by a service provider that provides a cloud-based device management service to remote enterprise devices operated by users associated with particular enterprises. Such service provider device(s) include one or more processors and one or more computer-readable storage media including computer-executable instructions that, when executed by the processor(s), cause the processor(s) to perform the blocks of the method 400. An exemplary embodiment of such computer-readable storage media is described with respect to FIG. 7. Moreover, in various embodiments, the method 400 is executed within the context of a network environment including the service provider device(s) as well as remote enterprise devices operating within a particular enterprise network and, optionally, one or more remote enterprise admin devices for the particular enterprise, as described further with respect to the exemplary network environment of FIGS. 6A and 6B.

The method 400 begins at block 402, at which device attributes corresponding to enterprise devices within an enterprise network are accessed via a network. In various embodiments, the device attributes for each enterprise device include one or more categorical attributes and/or one or more numerical attributes. Moreover, in various embodiments, the device attributes (or at least a portion of such device attributes) are accessed by monitoring near-real-time device telemetry for each enterprise device.

At block 404, the device attributes are provided to a supervised machine learning model. At block 406, each enterprise device is predicted to be healthy or anomalous via a supervised machine learning model, where the enterprise device is predicted to be healthy unless the supervised machine learning model determines that a probability of the enterprise device being anomalous exceeds a specified confidence threshold. In various embodiments, such specified confidence threshold is set in response to user input provided via the user interface.

At block 408, for each enterprise device that is predicted to be anomalous, a portion of the corresponding device attributes are perturbed via an automated counterfactual generator to generate synthetic data representative of counterfactual healthy devices corresponding to the enterprise device, where each counterfactual healthy device is predicted to be healthy via the supervised machine learning model based on the perturbation of the corresponding device attributes. In various embodiments, perturbing the device attributes via the automated counterfactual generator includes (at least in part) modifying the value of one or more numerical attributes and/or one or more categorical attributes of the corresponding enterprise device. In various embodiments, this includes receiving, via the user interface, user input (e.g., from the enterprise admin) including a specification of the portion of the device attributes to be perturbed for each enterprise device and then perturbing the portion of the corresponding device attributes for each enterprise device in accordance with such user input. Moreover, in various embodiments, this includes automatically determining, based on specified enterprise-level policies, a first group of the device attributes that cannot be perturbed, automatically determining, based on the specified enterprise-level policies, a second group of the device attributes that cannot be perturbed beyond a specified degree, and then perturbing the portion of the device attributes for each enterprise device such that any corresponding device attributes in the first group are not perturbed and any corresponding device attributes in the second group are not perturbed beyond the specified degree.

At block 410, for each enterprise device that is predicted to be anomalous, one or more recommended remedial actions are generated, where the recommended remedial actions for each enterprise device include actions that will cause the enterprise device to approximate each corresponding counterfactual healthy device represented by the synthetic data generated at block 408. Finally, at block 412, the recommended remedial action(s) are caused to be surfaced via a user interface.

The block diagram of FIG. 4 is not intended to indicate that the blocks of the method 400 are to be executed in any particular order, or that all of the blocks of the method 400 are to be included in every case. Moreover, any number of additional blocks may be included within the method 400, depending on the details of the specific implementation. For example, in various embodiments, the method 400 is repeated at a predetermined cadence as part of a cloud-based device management service. Furthermore, in some embodiments, one or more of the recommended remedial actions are automatically performed for one or more of the enterprise devices.

Figure 5:
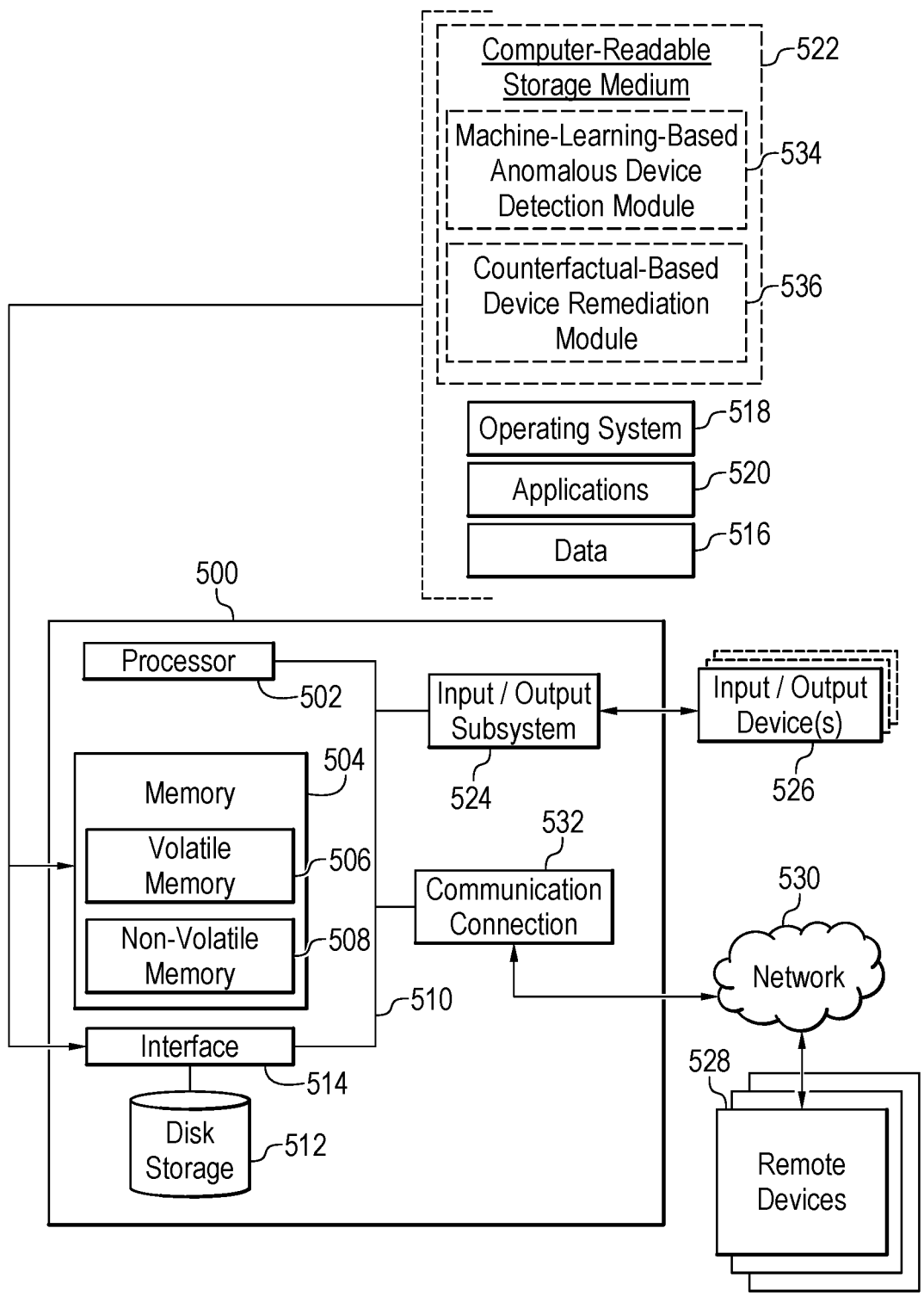
FIG. 5 is a block diagram of an exemplary device for implementing the techniques described herein.

FIG. 5 is a block diagram of an exemplary device 500 for implementing the techniques described herein. The exemplary device 500 includes a processor 502 and a memory 504. The processor 502 may include any suitable type of processing unit or device, such as, for example, a single-core processor, a multi-core processor, a computing cluster, or any number of other configurations. Moreover, the processor 502 may include, for example, an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 504 typically (but not always) includes both volatile memory 506 and non-volatile memory 508. The volatile memory 506 retains or stores information so long as the memory is supplied with power. By contrast, the nonvolatile memory 508 is capable of storing (or persisting) information even when a power supply is not available. The volatile memory 506 may include, for example, RAM (e.g., synchronous RAM (SRAM), dynamic RAM (DRAM), synchronous dynamic RAM (SDRAM), and the like) and CPU cache memory. The nonvolatile memory 508 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 502 and the memory 504, as well as other components of the device 500, are interconnected by way of a system bus 510. The system bus 510 can be implemented using any suitable bus architecture known to those skilled in the art.

According to the embodiment shown in FIG. 5, the device 500 also includes a disk storage 512. The disk storage 512 may include any suitable removable/non-removable, volatile/non-volatile storage component or device. For example, the disk storage 512 may include, but is not limited to, a magnetic disk drive, floppy disk drive, tape drive, Jaz drive, Zip drive, LS-210 drive, flash memory card, memory stick, or the like. In addition, the disk storage 512 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 512 to the system bus 510, a removable or non-removable interface is typically used, such as interface 514 shown in FIG. 5. Moreover, in various embodiments, the disk storage 512 and/or the memory 504 function as one or more databases that are used to store data 516 relating to the techniques described herein.

Those skilled in the art will appreciate that FIG. 5 describes software that acts as an intermediary between a user of the device 500 and the basic computing resources described with respect to the operating environment of the device 500. Such software includes an operating system 518. The operating system 518, which may be stored on the disk storage 512, acts to control and allocate the computing resources of the device 500. Moreover, system applications 520 take advantage of the management of the computing resources by the operating system 518 through one or more program modules stored within a computer-readable storage medium (or media) 522, as described further herein.

The device 500 also includes an input/output (I/O) subsystem 524. The I/O subsystem 524 includes a set of hardware, software, and/or firmware components that enable or facilitate inter-communication between the user of the device 500 and the processor 502 of the device 500. During operation of the device 500, the I/O subsystem 524 enables the user to interact with the device 500 through one or more I/O devices 526. Such I/O devices 526 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 502 through the system bus 510 via one or more interface ports (not shown) integrated within the I/O subsystem 524. Such interface ports may include, for example, a serial port, a parallel port, a game port, and/or a universal serial bus (USB).

In addition, such I/O devices 526 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the device 500 and to output information from the device 500 to a corresponding output device. Moreover, in some embodiments, the one or more output devices or channels are accessible via one or more adapters (not shown) integrated within the I/O subsystem 524.

In various embodiments, the device 500 is communicably coupled to any number of remote devices 528. The remote devices 528 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the device 500 is a service provider device hosting a cloud-based device management service providing the anomalous device detection and remediation functionalities described herein in a networked environment using logical connections to the remote devices 528, including remote enterprise devices and, optionally, one or more remote enterprise admin devices. As another example, in other embodiments, the device 500 is one of the enterprise devices or enterprise admin devices described herein, in which case at least a portion of the components of the computer-readable storage medium 522 shown in FIG. 5 may be omitted.

In various embodiments, the remote devices 528 are logically connected to the device 500 through a network 530 and then connected via a communication connection 532, which may be wireless. The network 530 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 532 includes the hardware/software employed to connect the network 530 to the bus 510. While the communication connection 532 is shown for illustrative clarity as residing inside the device 500, it can also be external to the device 500. The hardware/software for connection to the network 530 may include, for example, internal and external technologies, such as mobile phone switches, modems including regular telephone grade modems, cable modems and DSL modems, ISDN adapters, and/or Ethernet cards.

As described above, the system applications 520 take advantage of the management of the computing resources by the operating system 518 through one or more program modules stored within the computer-readable storage medium (or media) 522. In some embodiments, the computer-readable storage medium 522 is integral to the device 500, in which case it may form part of the memory 504 and/or the disk storage 512. In other embodiments, the computer-readable storage medium 522 is an external device that is connected to the device 500 when in use.

In various embodiments, program modules stored within the computer-readable storage medium 522 include program instructions or code that may be executed by the processor 502 to perform various operations. In various embodiments, such program modules include, but are not limited to, a machine-learning-based anomalous device detection module 534 and a counterfactual-based device remediation module 536 that cause the processor 502 to perform the techniques described herein, as described with respect to the method 400 of FIG. 4, for example.

It is to be understood that the block diagram of FIG. 5 is not intended to indicate that the device 500 is to include all of the components shown in FIG. 5. Rather, the device 500 can include fewer or additional components not illustrated in FIG. 5 (e.g., additional applications, additional modules, additional memory devices, additional network interfaces, etc.). Furthermore, any of the functionalities of the one or more program modules/sub-modules may be partially, or entirely, implemented in hardware and/or in the processor 502. For example, the functionality may be implemented with an application specific integrated circuit, in logic implemented in the processor 502, or in any other device.

Figure 6A:
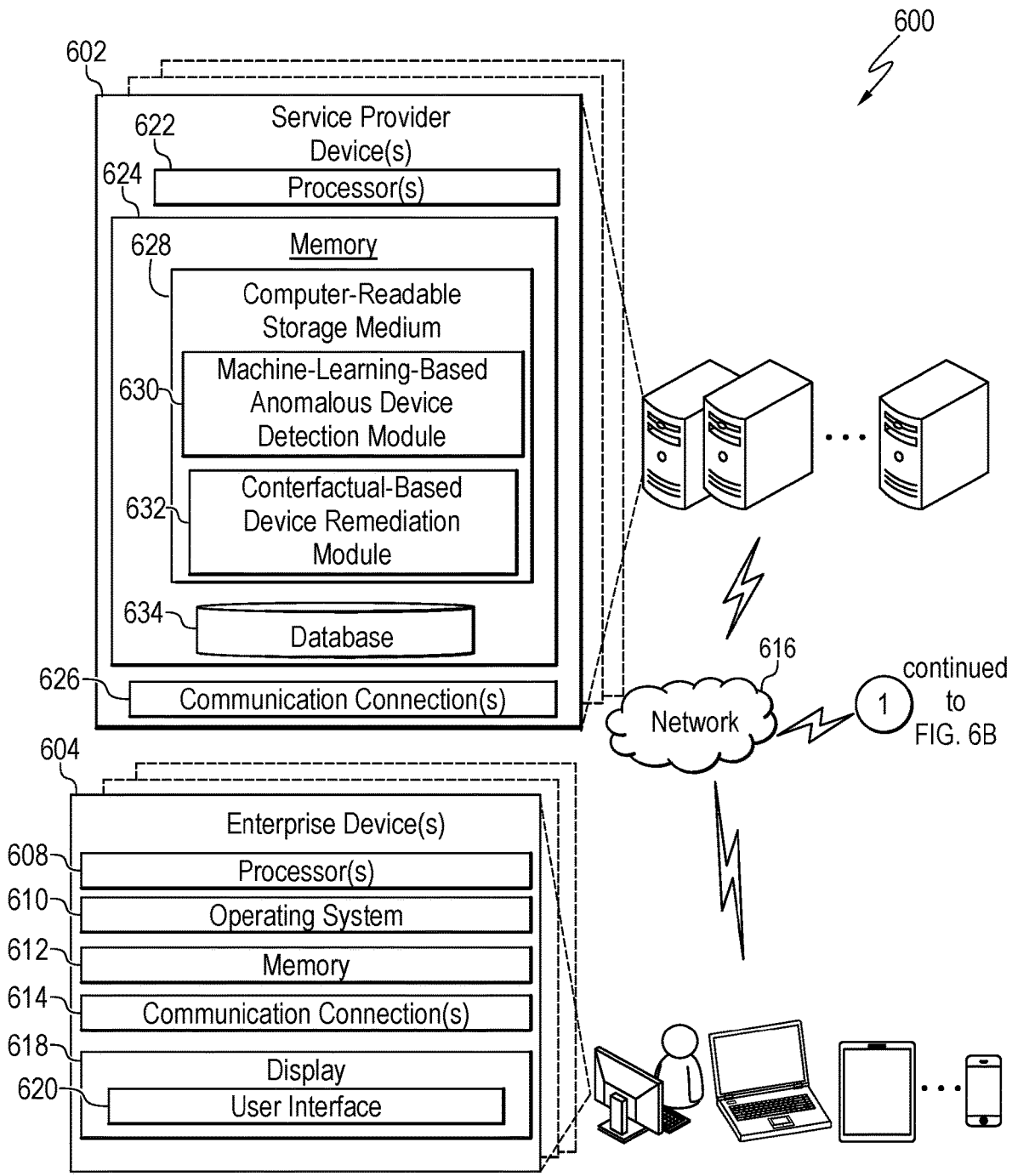
FIGS. 6A and 6B are a block diagram of an exemplary network environment for implementing the techniques described herein.
Figure 6B:
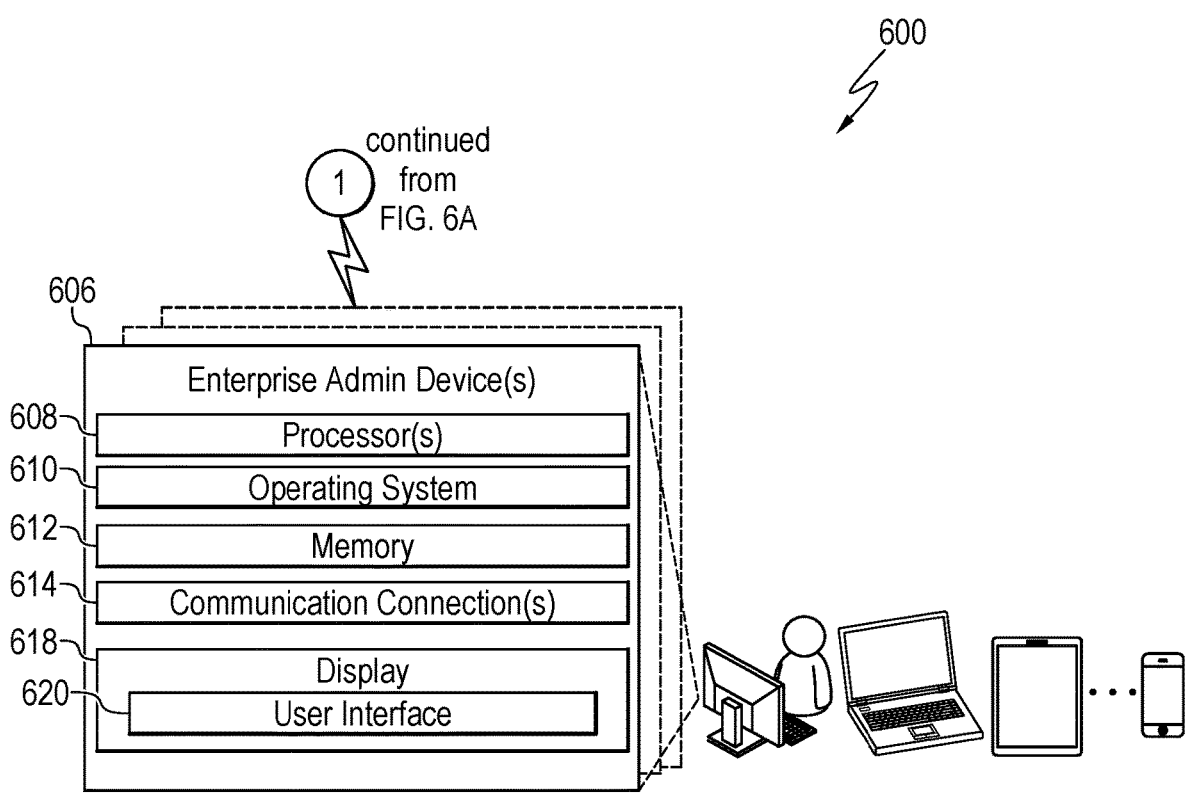

FIGS. 6A and 6B are a block diagram of an exemplary network environment 600 for implementing the techniques described herein. As shown in FIGS. 6A and 6B, the exemplary network environment 600 includes one or more service provider devices 602, one or more enterprise devices 604 operated by users associated with a particular enterprise, and one or more enterprise admin devices 606 operated by an administrator (e.g., an IT admin) that oversees the performance of the enterprise devices 604. (Notably, however, in some embodiments, the enterprise admin devices 606 may be omitted, and the users of the enterprises devices may control the performance of their corresponding enterprise devices without the aid of a separate administrator). As shown in FIGS. 6A and 6B, each enterprise device 604 and each enterprise admin device 606 includes (among other components) one or more processors 608, an operating system 610 that controls and allocates the computing resources of the device 604 or 606, and memory 612 communicably coupled to the processor(s) 608. Each enterprise device 604 and each enterprise admin device 606 may be implemented as any type of device, including (but not limited to) a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIGS. 6A and 6B show representative devices 604 and 606 in the forms of a desktop computer, a laptop computer, a tablet, and a mobile device. However, these are merely examples, and the devices 604 and 606 described herein may take many other forms.

Each enterprise device 604 and each enterprise admin device 606 also includes a communication connection 614 by which the device 604 or 606 is able to communicate with other devices, including the service provider device(s) 602, over a network 616. Furthermore, each enterprise device 604 and each enterprise admin device 606 includes a display 618, which may be a built-in display or an external display, depending on the particular type of device. According to embodiments described herein, the display 618 is configured to surface one or more user interfaces 620, including one or more user interfaces 620 that provide information relating to the anomalous device detection and remediation system described herein, such as (but not limited to) recommended remedial actions that are generated according to embodiments described herein.

In various embodiments, the anomalous device detection and remediation system described herein is provided or hosted by the service provider device(s) 602, which may be provided (at least in part) as one or more server farms or data centers, as shown in FIG. 6A. As a non-limiting example, in some embodiments, the service provider device(s) 602 are owned and operated by the provider of the operating system that runs on the enterprise device(s) 604 and the enterprise admin device(s) 606, and the operating system provider provides the anomalous device detection and remediation system as part of a cloud-based device management service or tool that enables the enterprise to monitor and control the enterprise devices. Moreover, it should be noted that the server components shown in FIG. 6A may each be implemented within any or all of the multiple service provider devices 602, depending on the details of the particular implementation. Specifically, the service provider device(s) 602 include one or more processors 622 communicably coupled to memory 624. The memory 624 may include one or more multiple memory devices, depending on the details of the particular implementation. The service provider device(s) 602 also include one or more communication connections 626 by which the anomalous device detection and remediation system may be executed or hosted on the enterprise device(s) 604 and, optionally, the enterprise admin devices 606 via the network 616. In particular, the service provider device(s) 602 take device attribute data corresponding to the enterprise device(s) 604 as input and provide the corresponding output via the user interface(s) 620 surfaced on the display 618 corresponding to each device 604 or 606.

In various embodiments, the memory 624 includes one or more computer-readable storage media 628. The computer-readable storage medium (or media) 628 includes program instructions or code that may be executed by the processor(s) 622 (and/or the processor(s) 608) to perform the anomalous device detection and remediation techniques described herein. In various embodiments, such program module(s) include, but are not limited to, a machine-learning-based anomalous device detection module 630 and a counterfactual-based device remediation module 632 that cause the processor(s) 622 to perform operations in accordance with the techniques described herein, as described with respect to the method 400 of FIG. 4, for example. (Notably, in some embodiments, at least a portion of the modules 630 and/or 632 may be stored within separate service provider device(s)

602. However, those skilled in the art will appreciate that the techniques described herein are not limited to any particular configuration of the service provider device(s) 602.) Furthermore, the memory 624 includes a database 634, which may be configured to store (among other data) the device attribute data corresponding to the enterprise device(s) 604, as well as data corresponding to the recommended remedial actions generated by the system.

It is to be understood that the simplified block diagram of FIGS. 6A and 6B is not intended to indicate that the network environment 600 is to include all of the components shown in FIGS. 6A and 6B. Rather, the network environment 600 may include different components and/or additional components not illustrated in FIGS. 6A and 6B. For example, in practice, the enterprise device(s) 604, and enterprise admin device(s) 606, and the service provider device(s) 602 will typically include a number of additional components not depicted in the simplified block diagram of FIGS. 6A and 6B, as described with respect to the device 500 of FIG. 5, for example.

Figure 7:
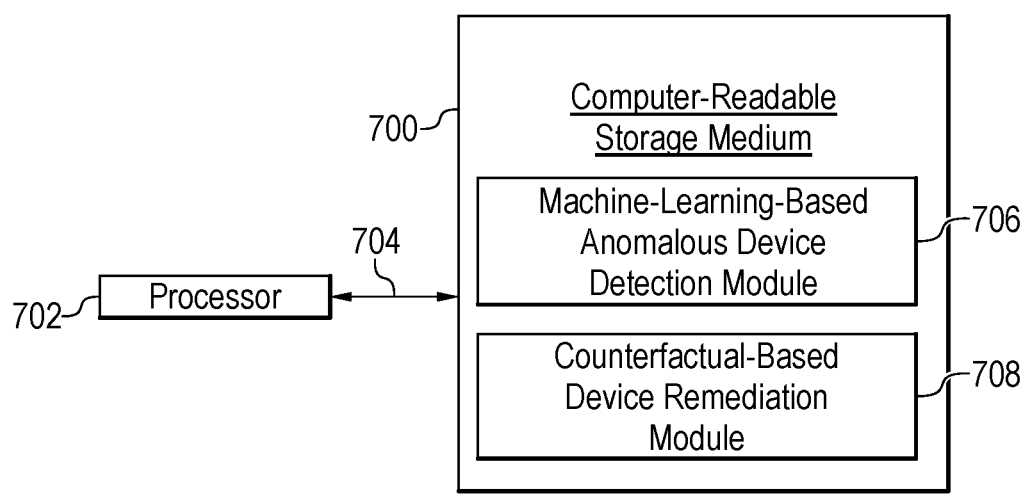
FIG. 7 is a block diagram of an exemplary computer-readable storage medium for implementing the techniques described herein.

FIG. 7 is a block diagram of an exemplary computer-readable storage medium (or media) 700 for implementing the techniques described herein. In various embodiments, the computer-readable storage medium 700 is accessed by one or more processor(s) 702 over one or more computer interconnects 704. For example, in some embodiments, the computer-readable storage medium 700 is the same as, or similar to, the computer-readable storage medium described with respect to the device 500 of FIG. 5 and/or the network environment 600 of FIGS. 6A and 6B.

In various embodiments, the computer-readable storage medium 700 includes code (i.e., computer-executable instructions) to direct the processor(s) 702 to perform the operations of the present techniques. Such code may be stored within the computer-readable storage medium 700 in the form of program modules, where each module includes a set of computer-executable instructions that, when executed by the processor(s) 702, cause the processor(s) 702 to perform a corresponding set of operations. In particular, as described herein, the computer-readable storage medium 700 includes a machine-learning-based anomalous device detection module 706 and a counterfactual-based device remediation module 708 that direct the processor(s) 702 to perform the techniques described herein.

Moreover, those skilled in the art will appreciate that any suitable number of the modules shown in FIG. 7 may be included within the computer-readable storage medium (or media) 700. Furthermore, any number of additional modules/sub-modules not shown in FIG. 7 may be included within the computer-readable storage medium (or media) 700, depending on the details of the specific implementation.

It should be noted that some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include devices, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium (or media)" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a device, the execution thereof causes, configures and/or adapts the executing device to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a device for execution via various transmission means and mediums, including carrier waves and/or propagated signals. However, for purposes of this disclosure, the term "computer-readable storage medium (or media)" refers specifically to nontransitory forms of computer-readable storage media and expressly excludes carrier waves and/or propagated signals.

The present techniques may be susceptible to various modifications and alternative forms, including (but not limited to) those described in the following examples:

Example 1 is a method for proactively detecting and remediating anomalous devices within an enterprise network, where the method is implemented via a device including a processor, and where the method includes: accessing, via a network, device attributes corresponding to enterprise devices within an enterprise network; providing the device attributes to a supervised machine learning model; predicting, via the supervised machine learning model, whether each enterprise device is healthy or anomalous, where the enterprise device is predicted to be healthy unless the supervised machine learning model determines that a probability of the enterprise device being anomalous exceeds a specified confidence threshold; for each enterprise device that is predicted to be anomalous, perturbing a portion of the corresponding device attributes via an automated counterfactual generator to generate synthetic data representative of counterfactual healthy devices corresponding to the enterprise device, where each counterfactual healthy device is predicted to be healthy via the supervised machine learning model based on the perturbation of the corresponding device attributes; generating, for each enterprise device that is predicted to be anomalous, at least one recommended remedial action that will cause the enterprise device to approximate each corresponding counterfactual healthy device as represented by the synthetic data; and causing surfacing, via a user interface, of the at least one recommended remedial action for each enterprise device that is predicted to be anomalous.

Example 2 includes the method of example 1, including or excluding optional features. In this example, the device attributes for each enterprise device include at least one of a categorical attribute or a numerical attribute, and perturbing the portion of the corresponding device attributes via the automated counterfactual generator includes modifying a value of the at least one of the categorical attribute or the numerical attribute of the corresponding enterprise device.

Example 3 includes the method of example 1 or 2, including or excluding optional features. In this example, the method includes accessing the device attributes corresponding to each enterprise device by monitoring near-real-time device telemetry for the enterprise device.

Example 4 includes the method of any one of examples 1 to 3, including or excluding optional features. In this example, the method includes receiving, via the user interface, user input including a specification of the portion of the device attributes to be perturbed for each enterprise device; and perturbing the portion of the corresponding device attributes for each enterprise device in accordance with the user input.

Example 5 includes the method of any one of examples 1 to 4, including or excluding optional features. In this example, the method includes, during the perturbation of the portion of the device attributes: automatically determining, based on specified enterprise-level policies, a first group of the device attributes that cannot be perturbed; automatically determining, based on the specified enterprise-level policies, a second group of the device attributes that cannot be perturbed beyond a specified degree; and perturbing the portion of the device attributes for each enterprise device such that any corresponding device attributes in the first group are not perturbed and any corresponding device attributes in the second group are not perturbed beyond the specified degree.

Example 6 includes the method of any one of examples 1 to 5, including or excluding optional features. In this example, the method is repeated at a predetermined cadence as part of a cloud-based device management service.

Example 7 includes the method of any one of examples 1 to 6, including or excluding optional features. In this example, the method includes setting the specified confidence threshold in response to user input provided via the user interface.

Example 8 includes the method of any one of examples 1 to 7, including or excluding optional features. In this example, the method includes automatically performing at least one of the recommended remedial actions for at least one of the enterprise devices.

Example 9 is a service provider device. The service provider device includes a processor and a communication connection for connecting enterprise devices and an enterprise admin device to the service provider device via a network, where the enterprise devices and the enterprise admin device are within a same enterprise network. The service provider device also includes a computer-readable storage medium operatively coupled to the processor. The computer-readable storage medium includes computer-executable instructions that, when executed by the processor, cause the processor to: access, via a network, device attributes corresponding to the enterprise devices; provide the device attributes to a supervised machine learning model; predict, via the supervised machine learning model, whether each enterprise device is healthy or anomalous, where the enterprise device is predicted to be healthy unless the supervised machine learning model determines that a probability of the enterprise device being anomalous exceeds a specified confidence threshold; for each enterprise device that is predicted to be anomalous, perturb a portion of the corresponding device attributes via an automated counterfactual generator to generate synthetic data representative of counterfactual healthy devices corresponding to the enterprise device, where each counterfactual healthy device is predicted to be healthy via the supervised machine learning model in accordance with the specified confidence threshold; generate, for each enterprise device that is predicted to be anomalous, at least one recommended remedial action that will cause the enterprise device to approximate each corresponding counterfactual healthy device as represented by the synthetic data; and cause surfacing, via a user interface provided on a display of the enterprise admin device, of the at least one recommended remedial action for each enterprise device that is predicted to be anomalous.

Example 10 includes the service provider device of example 9, including or excluding optional features. In this example, the device attributes for each enterprise device include at least one of a categorical attribute or a numerical attribute, and the computer-readable storage medium includes computer-executable instructions that, when executed by the processor, cause the processor to perturb the portion of the corresponding device attributes via the automated counterfactual generator by modifying a value of the at least one of the categorical attribute or the numerical attribute of the corresponding enterprise device.

Example 11 includes the service provider device of example 9 or 10, including or excluding optional features. In this example, the computer-readable storage medium includes computer-executable instructions that, when executed by the processor, cause the processor to access the device attributes corresponding to each enterprise device by monitoring near-real-time device telemetry for the enterprise device.

Example 12 includes the service provider device of any one of examples 9 to 11, including or excluding optional features. In this example, the computer-readable storage medium includes computer-executable instructions that, when executed by the processor, cause the processor to: receive, via the user interface, user input including a specification of the portion of the device attributes to be perturbed for each enterprise device; and perturb the portion of the corresponding device attributes for each enterprise device in accordance with the user input.

Example 13 includes the service provider device of any one of examples 9 to 12, including or excluding optional features. In this example, the computer-readable storage medium includes computer-executable instructions that, when executed by the processor, cause the processor to: automatically determine, based on specified enterprise-level policies, a first group of the device attributes that cannot be perturbed; automatically determine, based on the specified enterprise-level policies, a second group of the device attributes that cannot be perturbed beyond a specified degree; and perturb the portion of the device attributes for each enterprise device such that any corresponding device attributes in the first group are not perturbed and any corresponding device attributes in the second group are not perturbed beyond the specified degree.

Example 14 includes the method of any one of examples 9 to 13, including or excluding optional features. In this example, the computer-readable storage medium includes computer-executable instructions that, when executed by the processor, cause the processor to set the specified confidence threshold in response to user input provided via the user interface.

Example 15 includes the method of any one of examples 9 to 14, including or excluding optional features. In this example, the computer-readable storage medium includes computer-executable instructions that, when executed by the processor, cause the processor to automatically perform at least one of the recommended remedial actions for at least one of the enterprise devices.

Example 16 is a computer-readable storage medium. The computer-readable storage medium includes computer-executable instructions that, when executed by a processor, cause the processor to: access, via a network, device attributes corresponding to enterprise devices within an enterprise network; provide the device attributes to a supervised machine learning model; predict, via the supervised machine learning model, whether each enterprise device is healthy or anomalous, where the enterprise device is predicted to be healthy unless the supervised machine learning model determines that a probability of the enterprise device being anomalous exceeds a specified confidence threshold; for each enterprise device that is predicted to be anomalous, perturb a portion of the corresponding device attributes via an automated counterfactual generator to generate synthetic data representative of counterfactual healthy devices corresponding to the enterprise device, where each counterfactual healthy device is predicted to be healthy via the supervised machine learning model based on the perturbation of the corresponding device attributes; generate, for each enterprise device that is predicted to be anomalous, at least one recommended remedial action that will cause the enterprise device to approximate each corresponding counterfactual healthy device as represented by the synthetic data; and cause surfacing, via a user interface, of the at least one recommended remedial action for each enterprise device that is predicted to be anomalous.

Example 17 includes the computer-readable storage medium of example 16, including or excluding optional features. In this example, the device attributes for each enterprise device include at least one of a categorical attribute or a numerical attribute, and the computer-executable instructions, when executed by the processor, cause the processor to perturb the portion of the corresponding device attributes via the automated counterfactual generator by modifying a value of the at least one of the categorical attribute or the numerical attribute of the corresponding enterprise device.

Example 18 includes the computer-readable storage medium of example 16 or 17, including or excluding optional features. In this example, the computer-executable instructions, when executed by the processor, cause the processor to: receive, via the user interface, user input including a specification of the portion of the device attributes to be perturbed for each enterprise device; and perturb the portion of the corresponding device attributes for each enterprise device in accordance with the user input.

Example 19 includes computer-readable storage medium of any one of examples 16 to 18, including or excluding optional features. In this example, the computer-executable instructions, when executed by the processor, cause the processor to: automatically determine, based on specified enterprise-level policies, a first group of the device attributes that cannot be perturbed; automatically determine, based on the specified enterprise-level policies, a second group of the device attributes that cannot be perturbed beyond a specified degree; and perturb the portion of the device attributes for each enterprise device such that any corresponding device attributes in the first group are not perturbed and any corresponding device attributes in the second group are not perturbed beyond the specified degree.

Example 20 includes the computer-readable storage medium of any one of examples 16 to 19, including or excluding optional features. In this example, the computer-executable instructions, when executed by the processor, cause the processor to automatically perform at least one of the recommended remedial actions for at least one of the enterprise devices.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of devices. Additionally, in various embodiments, all or some of the various methods and processes may also be embodied in executable hardware modules including, but not limited to, system on chips (SoC's), codecs, specially designed processors and/or logic circuits, and the like, on a device.

As suggested above, each method or process described herein is typically embodied within computer-executable instruction (or code) modules including individual routines, functions, looping structures, selectors, and switches (such as if-then and if-then-else statements), assignments, arithmetic computations, and the like, that, in execution, configure a device to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for proactively detecting and remediating anomalous devices within an enterprise network, wherein the method is implemented via a device comprising a processor, and wherein the method comprises:
    accessing, via a network, device attributes corresponding to enterprise devices within an enterprise network;
    providing the device attributes to a supervised machine learning model;
    predicting, via the supervised machine learning model, whether each enterprise device is healthy or anomalous, wherein the enterprise device is predicted to be healthy unless the supervised machine learning model determines that a probability of the enterprise device being anomalous exceeds a specified confidence threshold;
    for each enterprise device that is predicted to be anomalous, perturbing a portion of the corresponding device attributes via an automated counterfactual generator to generate synthetic data representative of counterfactual healthy devices corresponding to the enterprise device, wherein each counterfactual healthy device is predicted to be healthy via the supervised machine learning model based on the perturbation of the corresponding device attributes;
    generating, for each enterprise device that is predicted to be anomalous, at least one recommended remedial action that will cause the enterprise device to approximate each corresponding counterfactual healthy device as represented by the synthetic data; and causing surfacing, via a user interface, of the at least one recommended remedial action for each enterprise device that is predicted to be anomalous.

2. The method of claim 1, wherein the device attributes for each enterprise device comprise at least one of a categorical attribute or a numerical attribute, and wherein perturbing the portion of the corresponding device attributes via the automated counterfactual generator comprises modifying a value of the at least one of the categorical attribute or the numerical attribute of the corresponding enterprise device.

3. The method of claim 1, comprising accessing the device attributes corresponding to each enterprise device by monitoring near-real-time device telemetry for the enterprise device.

4. The method of claim 1, comprising:
receiving, via the user interface, user input comprising a specification of the portion of the device attributes to be perturbed for each enterprise device; and
perturbing the portion of the corresponding device attributes for each enterprise device in accordance with the user input.

5. The method of claim 1, comprising, during the perturbation of the portion of the device attributes:
automatically determining, based on specified enterprise-level policies, a first group of the device attributes that cannot be perturbed;
automatically determining, based on the specified enterprise-level policies, a second group of the device attributes that cannot be perturbed beyond a specified degree; and
perturbing the portion of the device attributes for each enterprise device such that any corresponding device attributes in the first group are not perturbed and any corresponding device attributes in the second group are not perturbed beyond the specified degree.

6. The method of claim 1, comprising repeating the method at a predetermined cadence as part of a cloud-based device management service.

7. The method of claim 1, comprising setting the specified confidence threshold in response to user input provided via the user interface.

8. The method of claim 1, comprising automatically performing at least one of the recommended remedial actions for at least one of the enterprise devices.

9. A service provider device, comprising:
a processor;
a communication connection for connecting enterprise devices and an enterprise admin device to the service provider device via a network, wherein the enterprise devices and the enterprise admin device are within a same enterprise network; and
a computer-readable storage medium operatively coupled to the processor, the computer-readable storage medium comprising computer-executable instructions that, when executed by the processor, cause the processor to:
access, via a network, device attributes corresponding to the enterprise devices;
provide the device attributes to a supervised machine learning model;
predict, via the supervised machine learning model, whether each enterprise device is healthy or anomalous, wherein the enterprise device is predicted to be healthy unless the supervised machine learning model determines that a probability of the enterprise device being anomalous exceeds a specified confidence threshold;
for each enterprise device that is predicted to be anomalous, perturb a portion of the corresponding device attributes via an automated counterfactual generator to generate synthetic data representative of counterfactual healthy devices corresponding to the enterprise device, wherein each counterfactual healthy device is predicted to be healthy via the supervised machine learning model in accordance with the specified confidence threshold;
generate, for each enterprise device that is predicted to be anomalous, at least one recommended remedial action that will cause the enterprise device to approximate each corresponding counterfactual healthy device as represented by the synthetic data; and
cause surfacing, via a user interface provided on a display of the enterprise admin device, of the at least one recommended remedial action for each enterprise device that is predicted to be anomalous.

10. The service provider device of claim 9, wherein the device attributes for each enterprise device comprise at least one of a categorical attribute or a numerical attribute, and wherein the computer-readable storage medium comprises computer-executable instructions that, when executed by the processor, cause the processor to perturb the portion of the corresponding device attributes via the automated counterfactual generator by modifying a value of the at least one of the categorical attribute or the numerical attribute of the corresponding enterprise device.

11. The service provider device of claim 9, wherein the computer-readable storage medium comprises computer-executable instructions that, when executed by the processor, cause the processor to access the device attributes corresponding to each enterprise device by monitoring near-real-time device telemetry for the enterprise device.

12. The service provider device of claim 9, wherein the computer-readable storage medium comprises computer-executable instructions that, when executed by the processor, cause the processor to:
receive, via the user interface, user input comprising a specification of the portion of the device attributes to be perturbed for each enterprise device; and
perturb the portion of the corresponding device attributes for each enterprise device in accordance with the user input.

13. The service provider device of claim 9, wherein the computer-readable storage medium comprises computer-executable instructions that, when executed by the processor, cause the processor to:
automatically determine, based on specified enterprise-level policies, a first group of the device attributes that cannot be perturbed;
automatically determine, based on the specified enterprise-level policies, a second group of the device attributes that cannot be perturbed beyond a specified degree; and
perturb the portion of the device attributes for each enterprise device such that any corresponding device attributes in the first group are not perturbed and any corresponding device attributes in the second group are not perturbed beyond the specified degree.

14. The service provider device of claim 9, wherein the computer-readable storage medium comprises computer-executable instructions that, when executed by the processor, cause the processor to set the specified confidence threshold in response to user input provided via the user interface.

15. The service provider device of claim 9, wherein the computer-readable storage medium comprises computer-executable instructions that, when executed by the processor, cause the processor to automatically perform at least one of the recommended remedial actions for at least one of the enterprise devices.

16. A computer-readable storage medium comprising computer-executable instructions that, when executed by a processor, cause the processor to:
 access, via a network, device attributes corresponding to enterprise devices within an enterprise network;
 provide the device attributes to a supervised machine learning model;
 predict, via the supervised machine learning model, whether each enterprise device is healthy or anomalous, wherein the enterprise device is predicted to be healthy unless the supervised machine learning model determines that a probability of the enterprise device being anomalous exceeds a specified confidence threshold;
 for each enterprise device that is predicted to be anomalous, perturb a portion of the corresponding device attributes via an automated counterfactual generator to generate synthetic data representative of counterfactual healthy devices corresponding to the enterprise device, wherein each counterfactual healthy device is predicted to be healthy via the supervised machine learning model based on the perturbation of the corresponding device attributes;
 generate, for each enterprise device that is predicted to be anomalous, at least one recommended remedial action that will cause the enterprise device to approximate each corresponding counterfactual healthy device as represented by the synthetic data; and
 cause surfacing, via a user interface, of the at least one recommended remedial action for each enterprise device that is predicted to be anomalous.

17. The computer-readable storage medium of claim 16, wherein the device attributes for each enterprise device comprise at least one of a categorical attribute or a numerical attribute, and wherein the computer-executable instructions, when executed by the processor, cause the processor to perturb the portion of the corresponding device attributes via the automated counterfactual generator by modifying a value of the at least one of the categorical attribute or the numerical attribute of the corresponding enterprise device.

18. The computer-readable storage medium of claim 16, wherein the computer-executable instructions, when executed by the processor, cause the processor to:
 receive, via the user interface, user input comprising a specification of the portion of the device attributes to be perturbed for each enterprise device; and
 perturb the portion of the corresponding device attributes for each enterprise device in accordance with the user input.

19. The computer-readable storage medium of claim 16, wherein the computer-executable instructions, when executed by the processor, cause the processor to:
 automatically determine, based on specified enterprise-level policies, a first group of the device attributes that cannot be perturbed;
 automatically determine, based on the specified enterprise-level policies, a second group of the device attributes that cannot be perturbed beyond a specified degree; and
 perturb the portion of the device attributes for each enterprise device such that any corresponding device attributes in the first group are not perturbed and any corresponding device attributes in the second group are not perturbed beyond the specified degree.

20. The computer-readable storage medium of claim 16, wherein the computer-executable instructions, when executed by the processor, cause the processor to automatically perform at least one of the recommended remedial actions for at least one of the enterprise devices.

* * * * *